United States Patent
Xue et al.

(10) Patent No.: US 11,403,745 B2
(45) Date of Patent: Aug. 2, 2022

(54) METHOD, APPARATUS AND MEASUREMENT DEVICE FOR MEASURING DISTORTION PARAMETERS OF A DISPLAY DEVICE, AND COMPUTER-READABLE MEDIUM

(71) Applicants: Beijing BOE Optoelectronics Technology Co., Ltd., Beijing (CN); BOE TECHNOLOGY GROUP CO., LTD., Beijing (CN)

(72) Inventors: Hongzhen Xue, Beijing (CN); Fuqiang Ma, Beijing (CN); Minglei Chu, Beijing (CN); Jiankang Sun, Beijing (CN); Guobing Yin, Beijing (CN); Zehua Dong, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/760,560

(22) PCT Filed: Sep. 26, 2019

(86) PCT No.: PCT/CN2019/108233
§ 371 (c)(1),
(2) Date: Apr. 30, 2020

(87) PCT Pub. No.: WO2020/073816
PCT Pub. Date: Apr. 16, 2020

(65) Prior Publication Data
US 2020/0342583 A1    Oct. 29, 2020

(30) Foreign Application Priority Data

Oct. 10, 2018 (CN) .......................... 201811178302.2

(51) Int. Cl.
*G06T 7/00* (2017.01)
*G06T 7/73* (2017.01)
*G06T 5/00* (2006.01)

(52) U.S. Cl.
CPC ............ *G06T 7/0002* (2013.01); *G06T 5/006* (2013.01); *G06T 7/73* (2017.01); *G06T 2207/10024* (2013.01); *G06T 2207/30168* (2013.01)

(58) Field of Classification Search
CPC ......... G06T 7/0002; G06T 7/73; G06T 5/006; G06T 2207/10024; G06T 2207/30168;
(Continued)

(56) References Cited

U.S. PATENT DOCUMENTS 5,977,994 A * 11/1999 Greenberg ............ G06T 3/4007
345/558
2012/0133780 A1   5/2012 Zhang et al.
(Continued)

FOREIGN PATENT DOCUMENTS

CN    103679166 A    3/2014
CN    104240216 A    12/2014
(Continued)

OTHER PUBLICATIONS

First Office Action, including Search Report, for Chinese Patent Application No. 201811178302.2, dated Dec. 18, 2019, 17 pages.

*Primary Examiner* — Thai Q Tran
*Assistant Examiner* — Nienru Yang
(74) *Attorney, Agent, or Firm* — Westman, Champlin & Koehler, P.A.

(57) ABSTRACT

The present disclosure provides a method, apparatus, and measurement device for measuring distortion parameters of a display device, and a computer-readable medium. The display device includes a display screen and a lens located (Continued)

on a light exiting side of the display screen, and the method includes: acquiring a distortion image which is generated by imaging an initial image through the lens, wherein the initial image is an image displayed on the display screen, the initial image comprises a plurality of first corner points, and the distortion image comprises a plurality of second corner points which match the plurality of first corner points respectively; and determining the distortion parameters of the display device according to a locational relationship between the second corner points and a first corner points which match the second corner points.

17 Claims, 9 Drawing Sheets

(58) Field of Classification Search
CPC ............ G06T 7/33; G06T 2207/30208; G06T 2207/30121; G06T 7/00; G06T 5/00

USPC ........................................................ 348/135
See application file for complete search history.

(56) References Cited

U.S. PATENT DOCUMENTS

2017/0161951 A1\* 6/2017 Fix ............................ G06T 5/00
2017/0199099 A1\* 7/2017 Chen .................. G01M 11/0264

FOREIGN PATENT DOCUMENTS

| CN | 105447871 A | 3/2016 |
| CN | 105701776 A | 6/2016 |
| CN | 105869142 A | 8/2016 |
| CN | 106815823 A | 6/2017 |
| CN | 108510549 A | 9/2018 |
| CN | 109191374 A | 1/2019 |

\* cited by examiner

METHOD, APPARATUS AND MEASUREMENT DEVICE FOR MEASURING DISTORTION PARAMETERS OF A DISPLAY DEVICE, AND COMPUTER-READABLE MEDIUM

CROSS-REFERENCE TO RELATED APPLICATION(S)

This application is a Section 371 National Stage Application of International Application No. PCT/CN2019/108233, filed on Sep. 26, 2019, entitled "METHOD, APPARATUS AND MEASUREMENT DEVICE FOR MEASURING DISTORTION PARAMETERS OF A DISPLAY DEVICE, AND COMPUTER-READABLE MEDIUM", which published as WO 2020073816 A1, on Apr. 16, 2020, and claims priority to Chinese Patent Application No. 201811178302.2, filed on Oct. 10, 2018, the disclosures of which are incorporated herein by reference in their entireties.

TECHNICAL FIELD

The present disclosure relates to the field of display technology, and more particularly, to a method, apparatus, and measurement device for measuring distortion parameters of a display device, and a computer-readable medium.

BACKGROUND

In a Virtual Reality (VR) device, in order to allow users to have a real sense of immersion, the virtual reality device should cover a visual range of human eyes as much as possible. This requires a magnifying glass having a spherical radian to be installed in the virtual reality device. However, when a conventional image is projected into the human eyes through the magnifying glass, the image is distorted, and therefore distortion parameters of the device needs to be known.

SUMMARY

The present disclosure provides a method for measuring distortion parameters of a display device comprising a display screen and a lens located on a light exiting side of the display screen, the method comprising: acquiring a distortion image which is generated by imaging an initial image through the lens, wherein the initial image is an image displayed on the display screen, the initial image comprises a plurality of first corner points, and the distortion image comprises a plurality of second corner points which match the plurality of first corner points respectively; and determining the distortion parameters of the display device according to a locational relationship between at least one of the plurality of second corner points and a first corner point which matches the at least one second corner point.

In an example, the distortion image is generated by photographing the initial image by an image collector through the lens, and the method further comprises:

correcting the distortion image according to parameters of the image collector.

In an example, before determining the distortion parameters of the display device according to a locational relationship between at least one of the plurality of second corner points and the first corner point which matches the at least one second corner point, the method further comprises:

determining whether locations of the plurality of second corner points in the distortion image satisfy a preset condition, and when locations of the plurality of second corner points in the distortion image satisfy a preset condition, executing the step of determining the distortion parameters of the display device according to a locational relationship between at least one of the plurality of second corner points and the first corner point which matches the at least one second corner point.

In an example, the first corner points are arranged in a first array, the second corner points are arranged in a second array, and the method further comprises:

determining locations of the plurality of first corner points in the first array and locations of the plurality of second corner points in the second array; and for each of the first corner points, determining a second corner point having a location in the second array identical to the location of the first corner point in the first array, as the second corner point which matches the first corner point.

In an example, determining locations of the plurality of first corner points in the first array and locations of the plurality of second corner points in the second array comprises:

determining at least one of the plurality of first corner points as a first reference corner point having attribute information different from that of first corner points other than the first reference corner point, wherein the attribute information comprises at least one of a corner point color and a corner point area;

determining at least one of the plurality of second corner points as a second reference corner point which matches the first reference corner points according to the attribute information; and determining the locations of the plurality of first corner points in the first array according to a locational relationship between the first reference corner point and other first corner points, and determining the locations of the plurality of second corner points in the second array according to a locational relationship between the second reference corner point and other second corner points.

In an example, the initial image is a barrel image comprising the plurality of first corner points arranged in the first array, and the first reference corner point comprise a central corner point which is the first corner point located at a center of the first array, wherein the central corner point has an area different from those of first corner points other than the central corner point.

In an example, determining at least one of the plurality of second corner points as a second reference corner point which matches the first reference corner point according to the attribute information comprises: determining a second corner point in the second array having an area different from those of other second corner points as the second reference corner point which matches the central corner point in the first array.

In an example, the first reference corner points further comprise: lateral corner points and longitudinal corner points, wherein the lateral corner points are first corner points located in the same row as the central corner point, the longitudinal corner points are first corner points located in the same column as the central corner point, the lateral corner points have a first color, the longitudinal corner points have a second color, and first corner points other than the lateral corner points and the longitudinal corner points have a third color, wherein the first color, the second color, and the third color are different from each other.

In an example, determining at least one of the plurality of second corner points as a second reference corner point which matches the first reference corner point according to the attribute information comprises: determining second corner points in the second array having the first color as second reference corner points which match the lateral corner points in the first array, and determining second corner points in the second array having the second color as second reference corner points which match the longitudinal corner points in the first array.

In an example, determining whether locations of the plurality of second corner points in the distortion image satisfy a preset condition comprises:

calculating a distance between a location of each of the second corner points in the distortion image and a preset reference location for the second corner point; and determining that the second corner point satisfies the preset condition when the distance is less than or equal to a preset threshold.

In an example, the method further comprises: if a location of at least one of the plurality of second corner points in the distortion image does not satisfy the preset condition, adjusting the location of the first corner point, which matches the second corner point of which the location does not satisfy the preset condition, in the initial image, and returning to execute the step of acquiring a distortion image which is generated by imaging an initial image through the lens, until all the plurality of second corner points in the distortion image satisfy the preset condition.

The embodiments of the present disclosure further provide an apparatus for measuring distortion parameters of a display device comprising a display screen and a lens located on a light exiting side of the display screen, the apparatus comprises a memory and a processor, wherein the memory has instructions stored therein, and the processor is configured to execute the instructions to:

acquire a distortion image which is generated by imaging an initial image through the lens, wherein the initial image is an image displayed on the display screen, the initial image comprises a plurality of first corner points, and the distortion image comprises a plurality of second corner points which match the plurality of first corner points respectively; and determine the distortion parameters of the display device according to a locational relationship between at least one of the plurality of second corner points and the first corner point which matches the at least one second corner point.

In an example, the distortion image is generated by photographing the initial image by an image collector through the lens, and the processor is further configured to:

correct the distortion image according to parameters of the image collector.

In an example, the first corner points are arranged in a first array, the second corner points are arranged in a second array, and the processor is further configured to:

determine locations of the plurality of first corner points in the first array and locations of the plurality of second corner points in the second array, and for each of the first corner points, determine a second corner point having a location in the second array identical to the location of the first corner point in the first array, as the second corner point which matches the first corner point.

In an example, the processor is configured to determine the locations of the plurality of first corner points in the first array and the locations of the plurality of second corner points in the second array by:

determining at least one of the plurality of first corner points as a first reference corner point having attribute information different from that of first corner points other than the first reference corner point, wherein the attribute information comprises at least one of a corner point color and a corner point area;

determining at least one of the plurality of second corner points as a second reference corner point which matches the first reference corner point according to the attribute information;

determining the locations of the plurality of first corner points in the first array according to a locational relationship between the first reference corner point and other first corner points, and determining the locations of the plurality of second corner points in the second array according to a locational relationship between the second reference corner point and other second corner points; and for each of the first corner points, determining a second corner point having a location in the second array identical to the location of the first corner point in the first array, as the second corner point which matches the first corner point.

In an example, the initial image is a barrel image comprising the plurality of first corner points arranged in the first array, and the first reference corner points comprise a central corner point which is the first corner point located at a center of the first array, wherein the center corner point has an area different from those of first corner points other than the central corner point.

In an example, the processor is further configured to: determine whether locations of the plurality of second corner points in the distortion image satisfy a preset condition, and when locations of the plurality of second corner points in the distortion image satisfy a preset condition, execute the step of determining the distortion parameters of the display device according to the locational relationship between at least one of the plurality of second corner points and the first corner point which matches the at least one second corner point, wherein the processor is configured to determine whether the locations of the plurality of second corner points in the distortion image satisfy the preset condition by:

calculating a distance between a location of each of the second corner points in the distortion image and a preset reference location for the second corner point; and determining that the second corner point satisfies the preset condition when the distance is less than or equal to a preset threshold, and trigger the parameter determination module to operate.

In an example, the processor is further configured to: in a case where a location of at least one of the plurality of second corner points in the distortion image does not satisfy the preset condition, adjust the location of the first corner point, which matches the second corner point of which the location does not satisfy the preset condition, in the initial image, and re-execute the step of acquiring a distortion image which is generated after an initial image passes through the lens, until all the plurality of second corner points in the distortion image satisfy the preset condition.

The embodiments of the present disclosure further provide a measurement device for measuring distortion parameters of a display device comprising a display screen and a lens located on a light exiting side of the display screen, the measurement device comprising:

an image collector located on one side of the lens facing away from the display screen, and configured to photograph an initial image displayed on the display device through the lens to obtain a distortion image; and a controller connected to the display screen of the display device and the image collector, and configured to perform the method described above.

The embodiments of the present disclosure further provide a non-transitory computer-readable medium having stored thereon instructions which, when executed by a processor, cause the processor to perform the method described above.

BRIEF DESCRIPTION OF THE ACCOMPANYING DRAWINGS

In order to more clearly illustrate the technical solutions according to the embodiments of the present disclosure, the accompanying drawings which need to be used in the description of the embodiments of the present disclosure will be briefly introduced below. Obviously, the accompanying drawings in the following description are only some embodiments of the present disclosure. Other accompanying drawings may further be obtained by those of ordinary skill in the art according to these accompanying drawings without any creative work.

Figure 12:
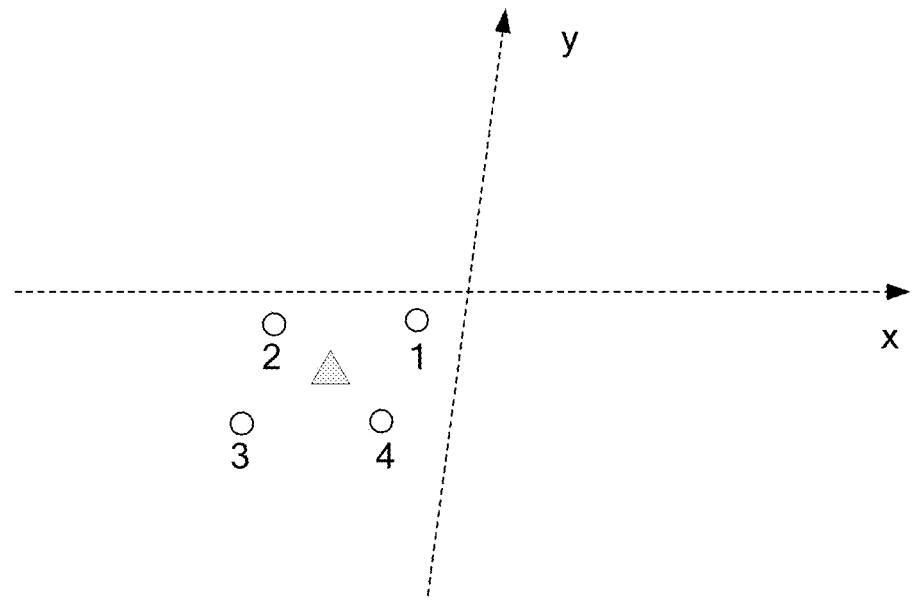
Figure 13:
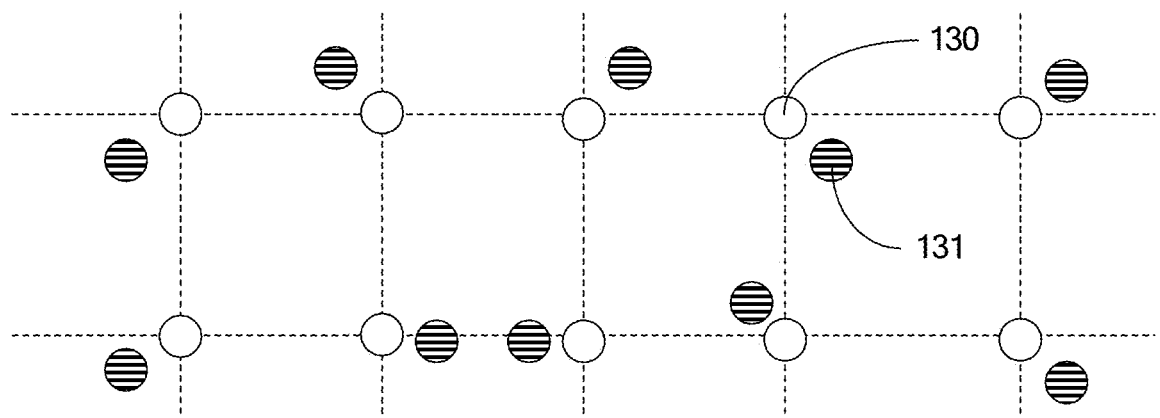

FIG. 12 illustrates a schematic diagram of fitting screen coordinates corresponding to respective image plane coordinates according to distortion parameters of known image plane coordinates according to an embodiment of the present disclosure; and FIG. 13 illustrates a schematic diagram of relative locations of second corner points with respect to preset reference points according to an embodiment of the present disclosure.

DETAILED DESCRIPTION

In order to make the above purposes, features, and advantages of the present disclosure more comprehensible, the present disclosure will be described in further detail below with reference to the accompanying drawings and specific embodiments.

Generally, distortion comprises pincushion distortion, barrel distortion, etc. The pincushion distortion, also known as pincushion aberration, is a phenomenon in which a picture shrinks towards a center due to a camera lens. The barrel distortion, also known as barrel aberration, is a distortion phenomenon in which a picture expands in a barrel shape due to physical characteristics of lenses and a structure of a group of glasses etc. in a camera lens. Currently, there are many ways in the industry to research on correction of distortion of VR devices. For example, theoretical distortion parameters are directly output through a corresponding software in terms of optical path design, and then manual fine-tuning is performed on an application side, which is time-consuming and labor-intensive way, and does not have a good effect.

Figure 1:
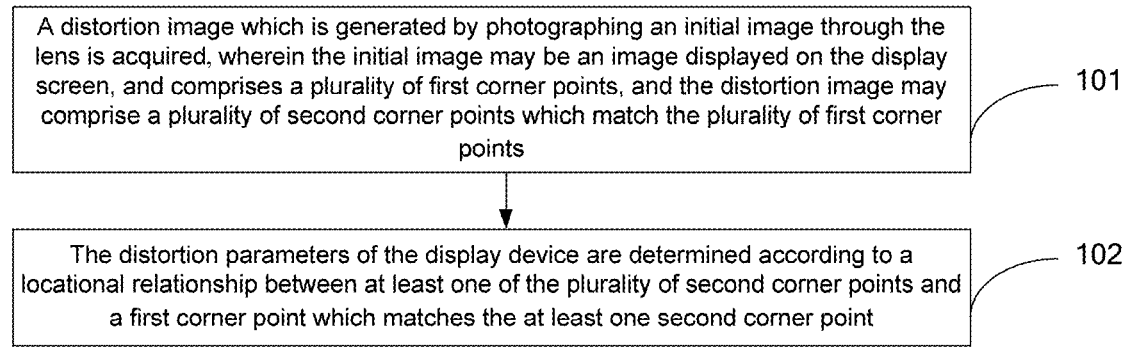
FIG. 1 illustrates a flowchart of a method for measuring distortion parameters according to an embodiment of the present disclosure.

As shown in FIG. 1, the embodiments of the present disclosure provide a method for measuring distortion parameters, which is used to measure distortion parameters of a display device. The display device comprises a display screen and a lens on a light exiting side of the display screen. The method for measuring distortion parameters may comprise the following steps.

In step 101, a distortion image which is generated by imaging an initial image through the lens is acquired, wherein the initial image may be an image displayed on the display screen, and comprises a plurality of first corner points, and the distortion image may comprise a plurality of second corner points which match the plurality of first corner points.

Figure 4:
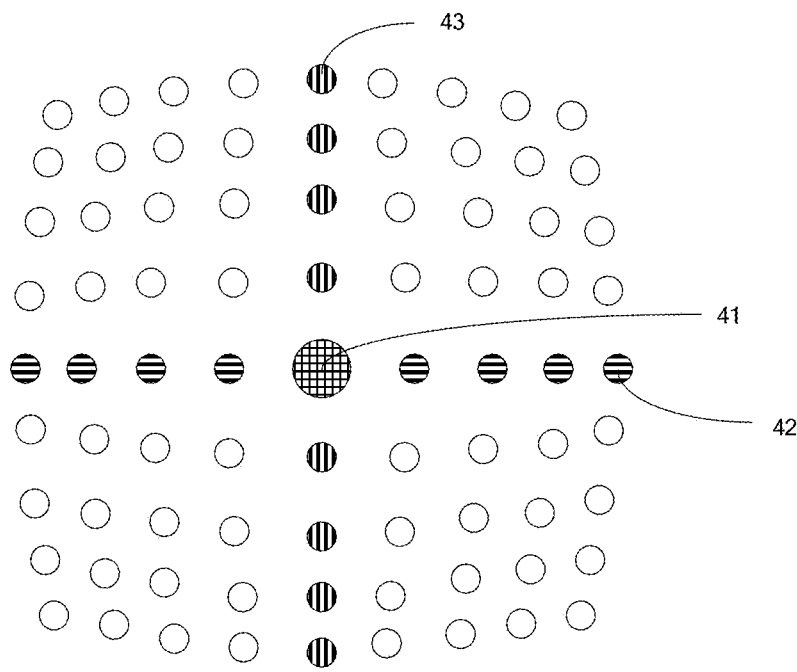
FIG. 4 illustrates a schematic diagram of an initial image according to an embodiment of the present disclosure.

In some embodiments, the initial image may be a theoretical anti-distortion image which is pre-burned according to theoretical distortion parameters of the lens or an image which is pre-designed by those skilled in the art according to practical situations. For example, the initial image may be a barrel image, which may be set in a form of barrel grids or a barrel array of corner points etc., for example. For example, as shown in FIG. 4, the barrel array of corner points may comprise a plurality of points arranged in a barrel shape, for example, but not limited to, a plurality of dots. In some embodiments, as compared to an image in a form of linear grids or array, the distortion image which is generated after the barrel image is imaged through the lens tends to be "horizontal and vertical". For example, corner points which are arranged in a barrel shape after being distorted may tend to be arranged horizontally and vertically, and curve lines in the barrel grids which extend transversely and longitudinally after being distorted tend to become horizontal lines and vertical lines. Therefore, the initial image is set in the form of barrel grids or barrel array of corner points, which may improve the efficiency of correction of distortion during measurement.

The corner points are points having predetermined attributes on the image, for example, points representing corners or protruding parts. The corner points may be defined by those skilled in the art according to practical situations, for example, as points of which attributes such as grayscales or colors in the image reach a predetermined degree. Herein, the corner points on the initial image are referred to as the first corner points and the corner points on the distortion image are referred to as the second corner points. When the initial image is in the form of barrel grids (for example, a theoretical distortion grid image provided by a lens manufacturer), the first corner points may be intersection points of grid lines; and when the initial image is in the form of barrel array of corner points, the first corner points may be dots arranged in a barrel shape.

In some embodiments, the initial image is displayed on the display screen, and the distortion image which is generated after light emitted from the display screen passes through the lens may be collected by photographing the initial image displayed on the display screen on one side of the lens opposite to the display screen through a photographing unit (for example, an image collector) such as a camera (for example, a wide-angle camera).

The first corner points on the initial image may be detected using methods such as grayscale-based corner point detection or contour curve-based corner point detection. For example, a contour of a first corner point on the initial image may be calculated, and then coordinates of a central point of the contour, that is, a location (for example, pixel coordinates, etc.) of the first corner point, may be obtained by fitting according to the contour. Correspondingly, the distortion image comprises a plurality of second corner points corresponding to (i.e., matching) the plurality of first corner points respectively, and the second corner points may also be detected using the methods such as grayscale-based corner point detection or contour curve-based corner point detection. Locations of the second corner points may be obtained according to an image processing method. For example, a contour of a second corner point on the distortion image may be calculated, and then coordinates of a central point of the contour, that is, a location (for example, pixel coordinates, etc.) of the second corner point, may be obtained by fitting according to the contour. The locations of the first corner points and the second corner points may further be converted into location coordinates etc. in the same coordinate system according to the respective pixel coordinates thereof. Here, the pixel coordinates of a first corner point may indicate a location at which a sub-pixel corresponding to the first corner point is located in an array of pixels for the initial image, and the pixel coordinates of a second corner point may indicate a location at which a sub-pixel corresponding to the second corner point is located in an array of pixels for the distortion image.

The display device may be a Virtual Reality (VR) display device etc.

In step 102, the distortion parameters of the display device are determined according to a locational relationship between at least one of the plurality of second corner points and the first corner point(s) which matches the at least one second corner point.

For example, the distortion parameters of the display device may be determined using software simulation or data fitting according to locations of second corner points which satisfy a preset condition and locations of corresponding first corner points. This will be described in further detail below.

In the method for measuring distortion parameters according to the present embodiment, the distortion parameters of the display device are determined according to second corner points on a distortion image which satisfy the preset condition and corresponding first corner points on the initial image. This method for measuring distortion parameters may eliminate the need for artificial blind adjustment, thus making the measurement of the distortion parameters easier, and this measurement method may accurately calculate distortion parameters at a plurality of points on the display device, which improves the measurement efficiency, thereby further improving the accuracy of correction of distortion.

In some embodiments, acquiring the distortion image which is generated after the initial image passes through the lens may comprise, for example, acquiring a distortion image which is generated after the initial image passes through the lens, and processing the acquired distortion image. Here, the processing may comprise rotating the acquired image to correct an angular deviation between the camera and the display screen; and the processing may further comprise performing correction processing to eliminate distortion caused by the camera itself etc.

Figure 2:
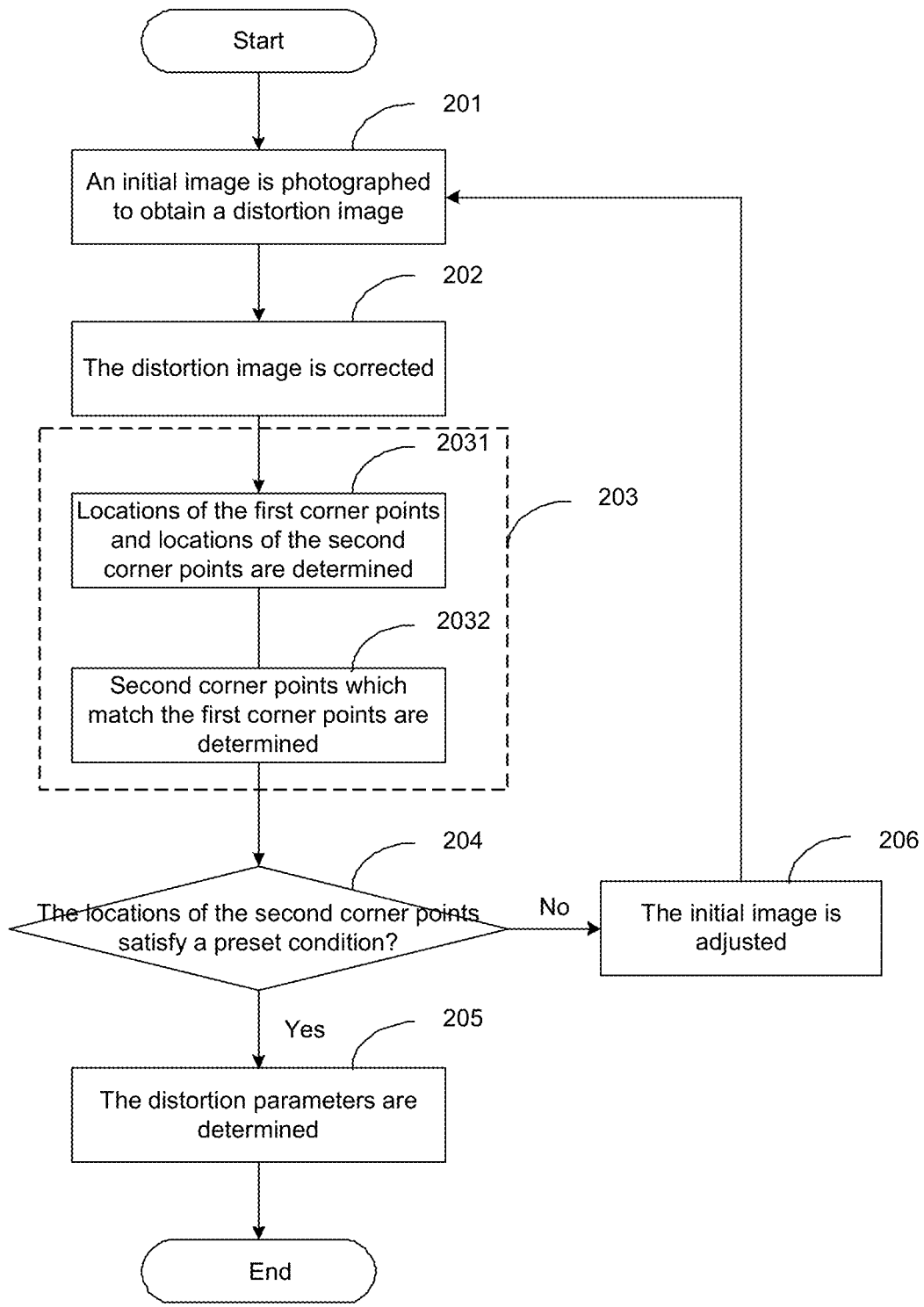
FIG. 2 illustrates a flowchart of a method for measuring distortion parameters according to another embodiment of the present disclosure.

FIG. 2 illustrates a flowchart of a method for measuring distortion parameters according to another embodiment of the present disclosure.

In step 201, an initial image displayed on a display screen is photographed using a photographing unit (for example, a camera) through a lens of a display device to obtain a distortion image.

For example, the initial image may be set as the barrel image shown in FIG. 4. For example, the distortion image is an image which is obtained by light emitted from the display screen on which the initial image is displayed reaching the photographing unit through the lens. In other words, distortion caused by the lens and a camera lens of the photographing unit is applied to the initial image.

In step 202, the distortion image is corrected according to parameters (for example, internal parameters) of the photographing unit to obtain a corrected distortion image.

For example, the photographing unit may be a device having a photographing function, for example, a camera, a wide-angle camera etc. In some embodiments, the distortion image which is photographed by the camera may be corrected according to the internal parameters of the camera to eliminate the distortion caused by the camera lens when the image is photographed. Here, the internal parameters of the photographing unit, for example, a camera, may be obtained by calibrating the camera using a calibration method which may be the Zhang Zhengyou method etc. The photographing unit may be operated under control of a controller. In some embodiments, the photographing unit may also be operated manually.

In some embodiments, step 202 may be omitted, and subsequent operations are performed using the distortion image which is obtained in step S201, thereby improving the processing speed.

In step 203, the first corner points are matched with the second corner points, that is, a correspondence relationship between the first corner points and the second corner points is established.

In some embodiments, the correspondence relationship between the first corner points and the second corner points may be determined according to the locations of the first corner points and the second corner points. For example, as shown in FIG. 4, the first corner points in the initial image are arranged in a first array, such that the second corner points in the distortion image are correspondingly arranged in a second array. In step 2031, locations of the plurality of first corner points in the first array (for example, locations in the array which are represented by a row number and a column number) and locations of the plurality of second corner points in the second array (for example, locations in the array which are represented by a row number and a column number) may be determined, and in step 2032, for each of the first corner points, a second corner point having a location in the second array identical to the location of the first corner point in the first array is determined as the second corner point which matches the first corner point.

In step 204, it is determined whether the locations of the plurality of second corner points in the distortion image satisfy a preset condition, and if so, step 205 is performed; otherwise, step 206 is performed.

In step 205, the distortion parameters of the display device are determined according to a locational relationship between at least one of the plurality of second corner points and the first corner point(s) which matches the at least one second corner point.

Figure 10:
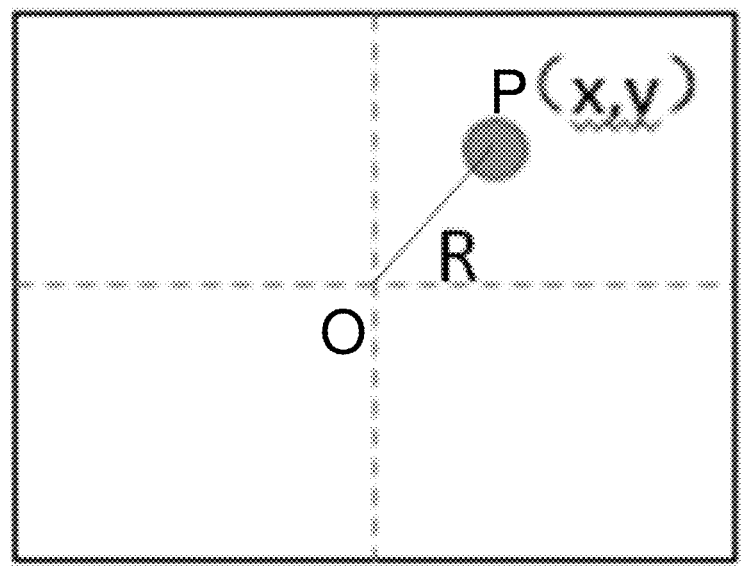
FIG. 10 illustrates a schematic diagram of a distance between a first corner point and an origin point on an initial image according to an embodiment of the present disclosure.

In some embodiments, the locations of the first corner points and the second corner points may be converted into location coordinates in the same plane coordinate system (which is parallel to a plane of the initial image and the distortion image) according to the respective pixel coordinates, for example, an origin of the coordinate system may be set at a location where an optical axis of the lens intersects the plane. The optical axis of the lens may be perpendicular to the above plane. As shown in FIG. 10, origin O is a point on an initial image (also referred to as a screen image) where an optical axis perpendicular to the initial image intersects the initial image is an, (x, y) are coordinates of a first corner point P, and R is a distance between the first corner point P and the coordinate origin O. In some embodiments, the distance R may be an Euclidean distance.

Figure 11:
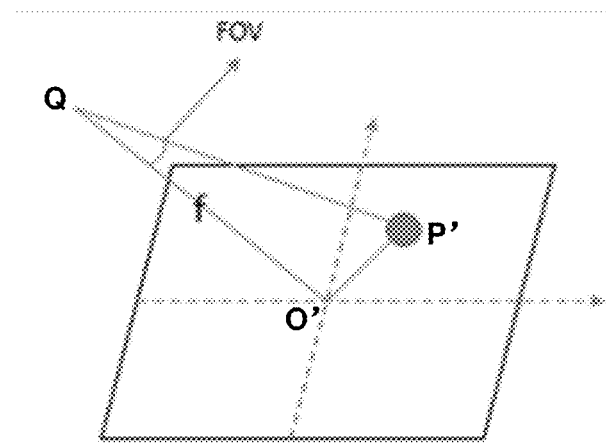
FIG. 11 illustrates a schematic diagram of a field of view angle corresponding to a second corner point on a distortion image according to an embodiment of the present disclosure.

As shown in FIG. 11, in an distortion image, O' represents an origin, Q represents a preset observation point (for example, a location of human eyes acts as the preset observation point, and in the present embodiment a location where a photographing unit such as a camera is located may acts as the preset observation point), and P' represents a second corner point which matches the first corner point P in the initial image. An angle FOV is formed by a connection line between the origin O' and the preset observation point Q (indicated by f in FIG. 11, wherein the connection line f may represent an optical axis of a lens) and a connection line between the second corner point P' and the preset observation point Q, and is used as a field of view angle of the second corner point P'. Generally, a distance between the observation point Q and the origin O' (for example, a focal length of a camera) may be set to a fixed value.

Distortion parameters may be obtained based on the distance R between the first corner point P and the origin O shown in FIG. 10 and the field of view angle FOV of the second corner point P' which matches the first corner point P shown in FIG. 11. For example, in some embodiments, a correspondence relationship list of distances R and field of view angles FOV may be used as an expression of distortion parameters. In some other embodiments, a correspondence relationship curve of the distances R and the field of view angles FOV may be formed, and coefficients of the curve may also be used as another expression of the distortion parameters.

In addition, the above distortion parameters are calculated according to the correspondence relationship between the distance R and the field of view angle FOV. In some embodiments, the distortion parameters may also be obtained according to a correspondence relationship between components of the distance R and the field of view angle FOV on respective coordinate axes of the above coordinate system, for example, a correspondence relationship list (Xp, Yp, FOVx, FOVy), wherein Xp and Yp are components of coordinates of the first corner point P on two coordinate axes, and FOVx, FOVy are components of the field of view angle FOV on the two coordinate axes.

In step 206, a location of a first corner point, which matches a second corner point of which a location does not satisfy the preset condition, is adjusted, and the procedure returns to step 201.

An exemplary implementation of the above step 2031 will be described below with reference to FIG. 3.

For example, when step 2031 is performed, reference corner points of the initial image and reference corner points of the distortion image may be determined firstly, and then locations of the respective first corner points are determined according to a relative locational relationship between the reference corner points and other first corner points in the initial image and locations of the respective second corner points are determined according to a relative locational relationship between the reference corner points and other second corner points in the distortion image, so as to determine a correspondence relationship between the first corner points and the respective second corner points in step 2032.

Figure 3:
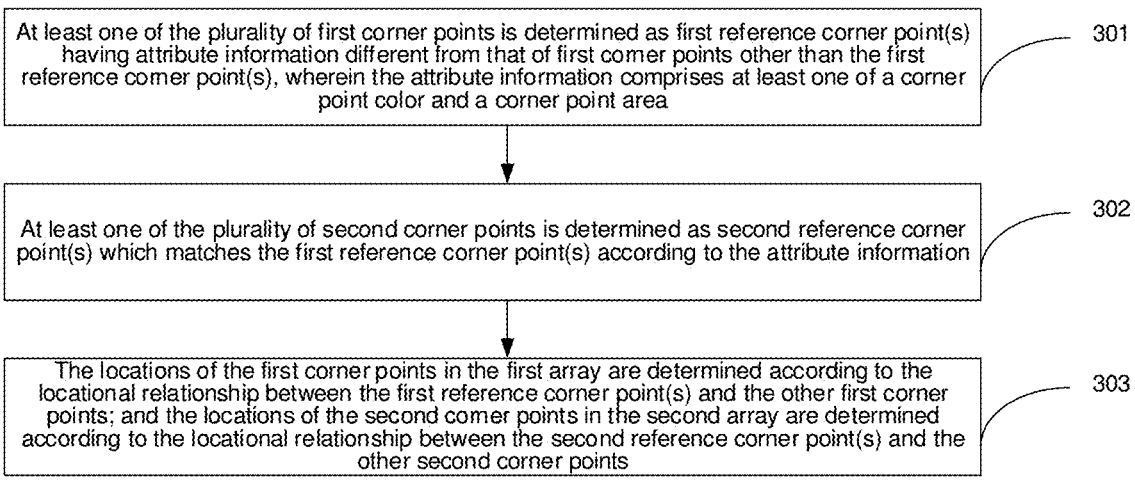
FIG. 3 illustrates a flowchart of matching corner points according to an embodiment of the present disclosure.

As shown in FIG. 3, in some embodiments, step 2031 may comprise the following steps.

In step 301, at least one of the plurality of first corner points is determined as first reference corner point(s) having attribute information different from that of first corner points other than the first reference corner point(s), wherein the attribute information comprises at least one of a corner point color and a corner point area.

As shown in FIG. 4, when the initial image is a barrel image, the initial image comprises a plurality of first corner points arranged in an array. First reference corner point(s) may comprise a central corner point 41, which is a first corner point located at a center of the barrel image (the initial image). An area of the central corner point 41 may be greater or less than those of first corner points other than the central corner point 41. The area of the central corner point 41 is greater than those of the other first corner points as shown in FIG. 4. The central corner point may be set to have a different area, which may improve the accuracy of matching the first corner points with the second corner points, thereby improving the accuracy of measuring the distortion parameters.

In order to further improve the accuracy of matching the first corner points with the second corner points, the first reference corner points may further comprise lateral corner points 42 and longitudinal corner points 43. The lateral corner points 42 are first corner points located in the same row as that of the central corner point 41, and the longitudinal corner points 43 are first corner point located in the same column as that of the central corner point 41. The lateral corner points 42, the longitudinal corner points 43, and first corner points other than the lateral corner point 42 and the longitudinal corner point 43 have different colors from each other.

For example, a color of the lateral corner point 42 may be blue (a first color), a color of the longitudinal corner point 43 may be red (a second color), and a color of the other first corner points may be green (a third color) etc. It should be illustrated that, in the present embodiment, since the central corner point may be distinguished according to sizes of areas, the central corner point may have any color.

It should be illustrated that the central corner point is distinguished from the other first corner points according to the sizes of the areas as shown in FIG. 4. In some embodiments, the central corner point may also be distinguished from the other first corner points according to corner point colors. Similarly, the lateral corner point and the longitudinal corner point are not limited to be distinguished according to corner point colors, but may also be determined or distinguished according to other attribute information such as sizes of areas.

In step 302, at least one of the plurality of second corner points is determined as second reference corner point(s) which matches the first reference corner point(s) according to the attribute information.

When the first reference corner points comprise the central corner point, since the area of the central corner point is greater than those of the other first corner points, one of the second corner points having the largest area is determined as a central corner point in the distortion image that corresponds to the central corner point in the initial image. The central corner point is set to have the largest area in the initial image and is used as a first reference corner point, and a second reference corner point which matches the first reference corner point is obtained by searching for a second corner point having the largest area in the distortion image, so that the central corner point in the distortion image may be used as the second reference corner point.

Similarly, when the first reference corner points further comprises the lateral corner points and the longitudinal corner points, second corner points which match the lateral corner point and the longitudinal corner point in the initial image respectively are determined from the second corner points in the distortion image according to the corner point colors, and may also be used as second reference corner points of the distortion image, for example, second reference corner points matching the lateral corner point in the initial image and second reference corner points matching the longitudinal corner point in the initial image.

In step 303, the locations of the first corner points in the first array (for example, the locations in the array which are represented by a row number and a column number, also referred to as location information) are determined according to the locational relationship between the first reference corner point(s) and the other first corner points; and the locations of the second corner points in the second array (also referred to as location information) are determined according to the locational relationship between the second reference corner point(s) and the other second corner points.

An exemplary implementation of the above step 2031, that is, how to determine the locations of the plurality of first corner points in the first array and the locations of the plurality of second corner points in the second array, will be described below with reference to FIGS. 5A and 5B.

Figure 5A:
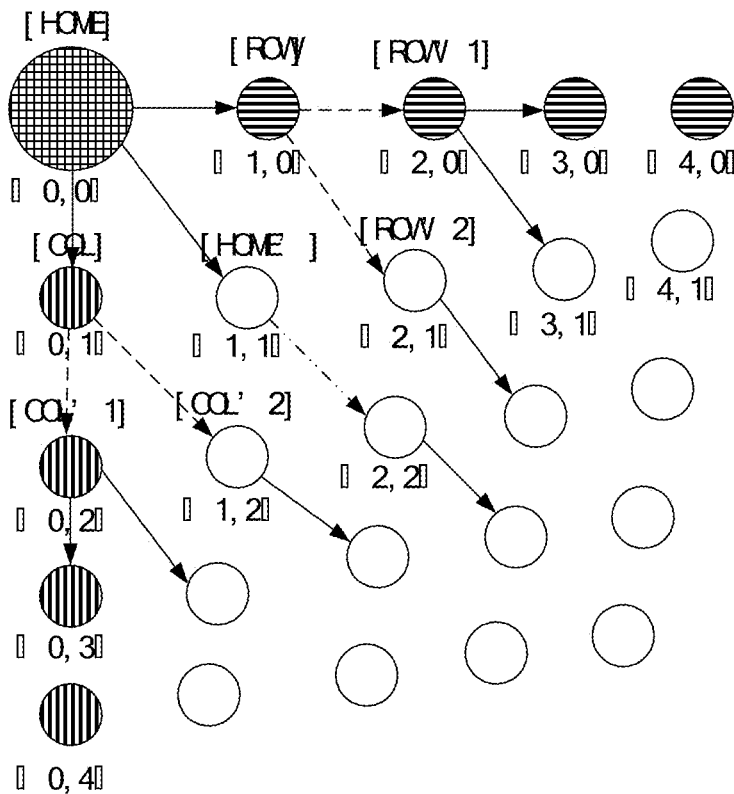
FIG. 5A illustrates a schematic diagram of determining locations of a corner points according to an embodiment of the present disclosure.

In some embodiments, as shown in FIG. 5A, by taking first corner points in a fourth quadrant in FIG. 4 as an example, location information of a central corner point in an initial image may be set to (0,0), and then a relative locational relationship between the first corner points and the central corner point may be determined according to locations (for example, pixel coordinates etc.) of the respective first corner points. For example, location information of the first corner point next to the right of the central corner point may be (1, 0), location information of the first corner point next to the bottom of the central corner point may be (0, 1), and so on, to determine location information of each first corner point. Similarly, location information of a central corner point in a distortion image is set to (0, 0), and location information such as (1, 0), (0, 1) etc. of second corner points may be determined according to a relative locational relationship between the second corner points and the second corner point (0,0) having the largest area (the central corner point in the distortion image).

When a first corner point and a second corner point having the same location information are mapped with each other, for example, since the central corner point (one of the first corner points having the largest area) in the initial image and the central corner point (one of the second corner points having the largest area) in the distortion image have the location information of (0, 0), the central corner point in the initial image is matched with the central corner point in the distortion image. A correspondence relationship between the first corner points and the respective second corner points may be determined according to the location information.

A specific implementation of establishing the correspondence relationship between the first corner points and the second corner points will be described below.

When the first reference corner points comprise the central corner point, the lateral corner points, and the longitudinal corner points, the central corner point has the largest area, the lateral corner points are blue, the longitudinal corner points are red, and other corner points are green, a first corner point having the largest area is firstly determined as the central corner point in the initial image, and then first corner points other than the central corner point are separated into three channels (red, blue, and green) according to corner point colors. The location information of the first corner points may be used to obtain a distribution of locations of the respective first corner points based on the locations (for example, pixel coordinates) of the first corner points in the case that the central corner point is used as the first reference point. As shown in FIG. 5A, numbers below the corner points indicate the location information of the first corner points (that is, rows and columns where the first corner points are located).

Figure 5B:
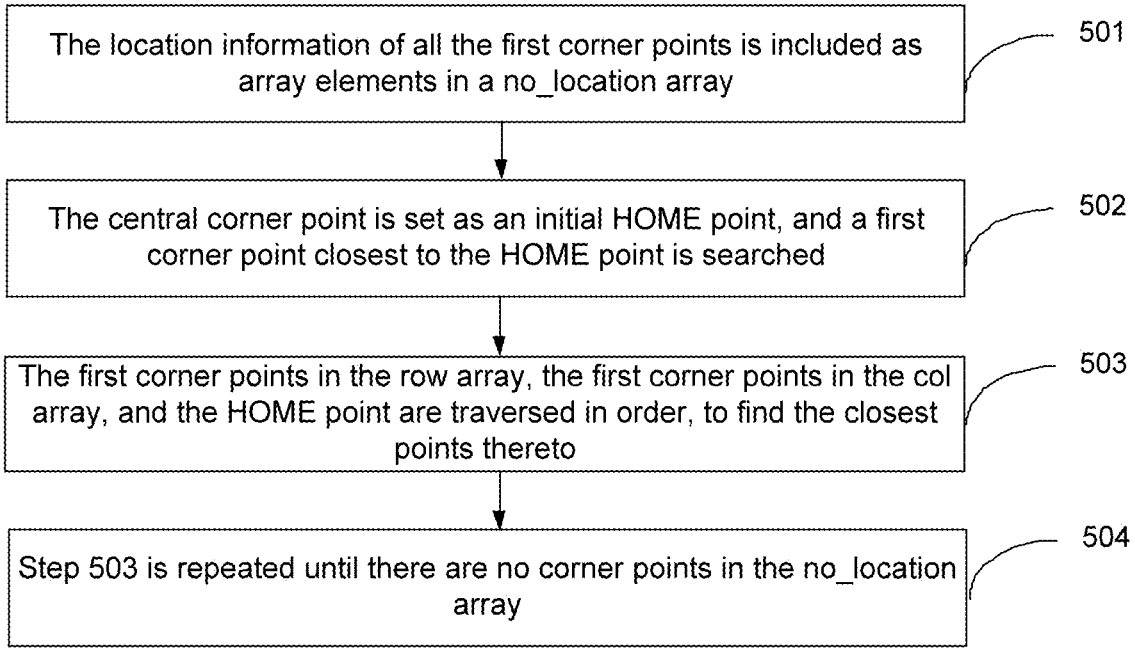
FIG. 5B illustrates a flowchart of determining locations of corner points according to an embodiment of the present disclosure.

As shown in FIG. 5B, still by taking the first corner points in the fourth quadrant in FIG. 4 as an example, a process of calculating the location information of the first corner points may be as follows.

In step 501, the location information of all the first corner points may be included as array elements in a no_location array (location information of all points in the array has not been determined).

In step 502, the central corner point is set as an initial HOME point (that is, a first reference corner point), which has location information of (0, 0). A first corner point closest to the HOME point is searched in no_location, for example, three times. Thereby, a first lateral corner point (in blue) to the right of the central corner point may be found (in, for example, a first search process), and location information of the first lateral corner point is determined to be (1, 0), and is stored in a row array; a first longitudinal corner point (in red) below the central corner point is further found (in, for example, a second search process), and location information of the first longitudinal corner is determined to be (0, 1), and is stored in a col array; and a green corner point on the lower right of the central corner point may further be found (in, for example, a third search process), location information of the green corner point is determined to be (1, 1), and the point (1, 1) is taken as a new HOME point (HOME' point shown in FIG. 5A). At the same time, the point (0, 0), the point (1, 0), the point (0, 1), and the point (1, 1) of which the location information has been determined are deleted from the no_location array.

Here, distances between the respective corner points may be Euclidean distances which are calculated according to the locations (for example, pixel coordinates etc.) of the corner points.

In step 503, the first corner points in the row array, the first corner points in the col array, and the HOME point are traversed in order, to find the closest points thereto. Here, for a first element in the row array, a search process is performed twice, and for other elements in the row array, a search process is performed once, to update found points into the row array in an order in which the points are found; for a first element in the col array, a search process is performed twice, and for other elements in the col array, a search process is performed once, to update found points into the col array in an order in which the points are found; and for the HOME point, a search process is performed once to update the HOME point with the found point. The corner points found are removed from the no_location array.

For example, for the point (1, 0) in the row array, a search process is performed twice to find points (2, 0) and (2, 1) in turn, and the points (2, 0) and (2, 1) are updated into the row array as a first element (row'1 shown in FIG. 5A) and a second element (row'2) in the row array. For the point (0, 1) in the col array, a search process is performed twice to find points (0, 2) and (1, 2) in turn, and the points (0, 2) and (1, 2) are updated into the col array as a first element (col'1 shown in FIG. 5A) and a second element (col'2) in the col array. For the HOME point (1, 1), a search process is performed once, to find point (2, 2), and the HOME point is updated with the point (2, 2).

In step 504, step 503 is repeated until there are no corner points in the no_location array, that is, location information of all the corner points has been determined. As shown in FIG. 5A, illustrated is a schematic diagram of determining location information of different corner points, wherein different arrows represent steps 503 in different cycles respectively.

The process of determining the location information of the second corner points in the distortion image may be the same as that of determining the location information of the first corner points, and will not be described in detail here.

An exemplary implementation of the above step 204, that is, how to determine whether the locations of the second corner points in the distortion image satisfy the preset condition, will be described below with reference to FIG. 6.

Here, when the second corner points satisfy the preset condition, a distortion degree of the distortion image is less than or equal to a specified value. The distortion degree is used to characterize a degree of distortion of the distortion image. The distortion degree of the distortion image is inversely proportional to a horizontal and vertical degree or straightness of an arrangement of the second corner points in the distortion image.

There are many ways to determine whether the distortion degree of the distortion image is less than or equal to the specified value. For example, this may implemented by calculating a distance between each of the second corner points and a preset reference point and determining whether the distance is less than or equal to a preset distance through calculation, or calculating an angle between connection lines between any two second corner points and a preset reference line and determining whether the angle is less than or equal to a preset angle through calculation etc. Here, the preset reference point, the preset reference line, and the specified value (for example, the preset distance or the preset angle) etc. may be set by those skilled in the art according to practical situations such as a structure of the display device and user requirements, etc., and specific values thereof are not limited in the present disclosure.

For example, there may be multiple types of preset conditions, as long as the distortion degree of the distortion image is less than or equal to the specified value.

Figure 6:
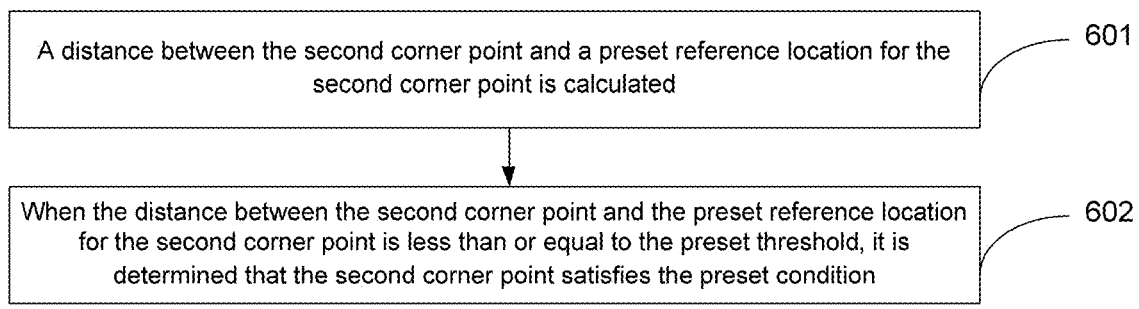
FIG. 6 illustrates a flowchart of determining whether a corner point satisfies a preset condition according to an embodiment of the present disclosure.

As shown in FIG. 6, there is provided an implementation of determining whether a location of a second corner point in the distortion image satisfies a preset condition. For example, the method may comprise the following steps.

In step 601, a distance between the second corner point and a preset reference location for the second corner point is calculated.

A corresponding reference location (also referred to as a reference point), that is, a location where each of the second corner points is expected to be located, may be set for each of the second corner points in the distortion image. Reference locations of second corner points in the same row in the distortion image are arranged in a straight line without distortion and reference locations of second corner points in the same column in the distortion image are arranged in a straight line without distortion.

Figure 7:
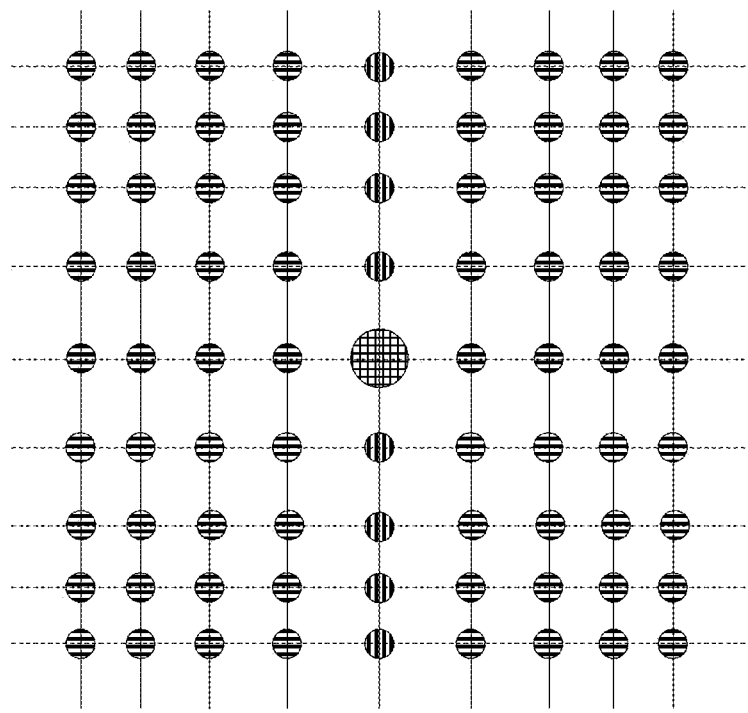
FIG. 7 illustrates a schematic diagram of a distribution of preset reference locations according to an embodiment of the present disclosure.

As shown in FIG. 7, corresponding reference locations may be set for the respective second corner points shown in FIG. 4, for example, reference locations (also referred to as reference points) of the respective second corner points are generated for the first reference corner points (for example, the central corner point, the lateral corner point, and the longitudinal corner point) and other first corner points in the first corner points, so as to obtain an array of reference points shown in FIG. 7. Reference points in the same row in the array of reference points are arranged in a straight line, and a straight line in which reference points in one row are arranged is parallel to a straight line in which reference points in another row are arranged; reference points in the same column in the array of reference points is arranged in a straight line, and a straight line in which reference points in one column are arranged is parallel to a straight line in which reference points in another column are arranged; and a distance between adjacent reference points in the same column is the same as that between adjacent reference points in the same row. In some embodiments, location information (i.e., specific rows and specific columns in the array) of the respective reference points in the array of reference points may also be determined, and reference points having the same location information as that of the second corner points are reference points corresponding to the second corner points.

As shown in FIG. 13, an Euclidean distance between a second corner point 131 and a reference location 130 for the second corner point 131 may be calculated according to pixel coordinates of the second corner point 131 and pixel coordinates of the reference location 130.

In step 602, when the distance between the second corner point and the preset reference location for the second corner point is less than or equal to the preset threshold, it is determined that the second corner point satisfies the preset condition.

For example, the threshold may be set to a width of four pixels (or a spacing of four pixels) etc. When the distance calculated in step 601 is less than or equal to the width of four pixels, it may be determined that the second corner point satisfies the preset condition. When the distance is greater than the preset threshold, it is determined that the second corner point does not satisfy the preset condition. A threshold for the distance may be determined by those skilled in the art according to practical situations, and is not limited in the present disclosure.

In steps 601 and 602, it is determined whether the second corner points on the distortion image are "horizontal and vertical", that is, whether the second corner points satisfy the preset condition, using an evaluation algorithm. In some embodiments, when all the second corner points in the distortion image satisfy the preset condition after being adjusted, that is, when the distortion image reaches the desired "horizontal and vertical" condition after being adjusted, the distortion parameters of the display device may be determined according to second corner points in the distortion image and first corner points in the initial image after being finally adjusted.

Referring back to FIG. 2, in step 206, for a second corner point which does not satisfy the preset condition, a deviation direction of the second corner point with respect to a preset reference point may be determined firstly. During the adjustment, a corresponding first corner point may be moved in a direction away from the deviation direction by a distance of one pixel or by any desired distance as needed at a time. For example, when the second corner point which does not satisfy the preset condition is located above the preset reference point (that is, a vertical coordinate of the second corner point is greater than a vertical coordinate of the preset reference point), the corresponding first corner point may be moved downwards by a distance of one pixel; and when the second corner point which does not satisfy the preset condition is located to the right of the preset reference point (that is, a horizontal coordinate of the second corner point is greater than a horizontal coordinate of the preset reference point), the corresponding first corner point may be moved by a distance of one pixel to the left.

After the adjustment is performed in step 206, the procedure may return to step 201 to repeat the steps of acquiring an image and corresponding corner points, and determining the corner points until all the second corner points which are finally obtained satisfy the preset condition, that is, the second corner points on the distortion image are all "horizontal and vertical". At this time, there is a desired distortion correspondence relationship between the first corner points on the initial image and the second corner points on the distortion image. Therefore, as described above, the distortion parameters of the display device may be determined according to locations of all the second corner points which satisfy the preset condition (comprising second corner points which initially satisfy the preset condition and second corner points which satisfy the preset condition after locations of first corner points are adjusted) and the corresponding first corner points.

No matter whether distortion coefficients (K1, K2, K3, . . . ) of the display device are calculated or the correspondence relationship between the coordinates of the first corner points and the field of view angles of the second corner points is obtained, coordinates (x, y) of a certain point on a screen when an image is actually displayed on the display device are finally to be determined. During rendering (using, for example, a Software Development Kit (SDK)), a viewfinder camera in a scene searches for a field of view angle FOV1 corresponding to image plane points according to a field of view angle FOV2 of the viewfinder camera, and then screen coordinates (x, y) corresponding to the field of view angle FOV1 are determined through fitting or calculation according to the distortion parameters or the correspondence relationship which is obtained using the above method, to finally determine locations where points in the scene need to be displayed on the screen.

In some embodiments, screen coordinates corresponding to the respective image plane coordinates may be determined through interpolation or fitting according to coordinates of a fixed number of image plane points (second corner points) (also referred to as image plane coordinates) and coordinates of object plane points (first corner points) (also referred to as object plane coordinates or screen coordinates) (the image plane points and the object plane points of the distortion parameters have been calculated). As shown in FIG. 12, illustrated is a schematic diagram of fitting screen coordinates corresponding to respective image plane coordinates according to distortion parameters of known image plane coordinates. As shown in FIG. 12, if coordinates (also referred to as screen coordinates) of an object plane point corresponding to a field of view angle FOV at an image plane point represented by a triangle in an image plane need to be calculated, the screen coordinates corresponding to the field of view angle FOV at the image plane point represented by the triangle may obtained by fitting based on the screen coordinates corresponding to field of view angles FOV of image plane points 1, 2, 3 and 4 represented by circles.

Figure 8:
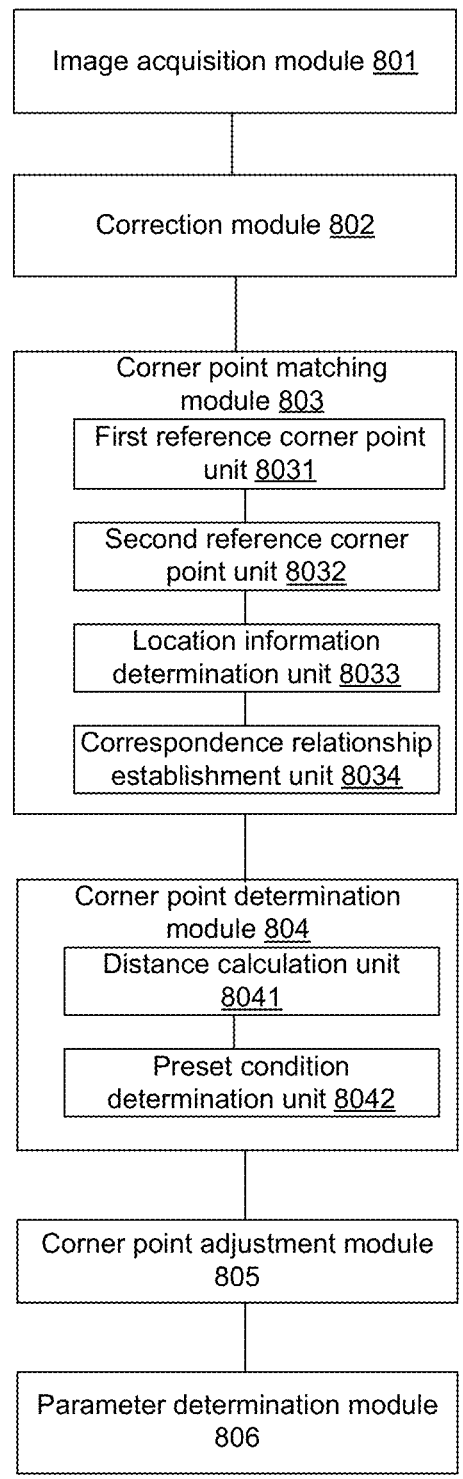
FIG. 8 illustrates a structural block diagram of an apparatus for measuring distortion parameters according to an embodiment of the present disclosure.

An embodiment of the present disclosure provides an apparatus for measuring distortion parameters, which is used to measure distortion parameters of a display device. The apparatus for measuring distortion parameters may comprise a memory and a processor, wherein the memory has instructions stored therein which when executed by the processor, cause the processor to perform the method according to any of the embodiments described above. The display device comprises a display screen and a lens located on a light exiting side of the display screen. As shown in FIG. 8, the measurement apparatus may comprise an image acquisition module 801 and a parameter determination module 806. In some embodiments, the measurement apparatus may further comprise a correction module 802. In some embodiments, the measurement apparatus may further comprise a corner point matching module 803. In some embodiments, the measurement apparatus may further comprise a corner point determination module 804. In some embodiments, the measurement apparatus may further comprise a corner point adjustment module 805.

The image acquisition module 801 may be configured to acquire a distortion image which is generated after an initial image passes through the lens, wherein the initial image is an image displayed on the display screen, and comprises a plurality of first corner points, and the distortion image comprises a plurality of second corner points which match the plurality of first corner points.

The parameter determination module 806 may be configured to determine the distortion parameters of the display device according to second corner points which satisfy a preset condition and corresponding first corner points.

In an implementation of the present embodiment, the image acquisition module 801 may be configured to receive a distortion image which is generated after an initial image photographed by a photographing unit passes through the lens. In some embodiments, the image acquisition module 801 may control the photographing unit such as a camera to photograph the initial image displayed on the display screen through the lens to obtain the distortion image, and receive the distortion image from the photographing unit.

The correction module 802 may be configured to correct the distortion image according to parameters (for example, internal parameters) of the photographing unit to obtain a corrected distortion image.

The corner point matching module 803 may be configured to establish a correspondence relationship between the first corner points and the second corner points. For example, the corner point matching module 803 may determine locations of the plurality of first corner points in the first array and locations of the plurality of second corner points in the second array, and for each of the first corner points, determine a second corner point of which a location in the second array is identical to the location of the first corner point in the first array as a second corner point which matches the first corner point.

In an implementation of the present embodiment, the corner point matching module 803 may comprise a first reference corner point unit 8031, a second reference corner point unit 8032, a location information determination unit 8033, and a correspondence relationship establishment unit 8034.

The first reference corner point unit 8031 may be configured to determine first reference corner point(s) belonging to the first corner points, wherein attribute information of the first reference corner point(s) is different from that of first corner points other than the first reference corner point(s), and the attribute information comprises at least one of a corner point color and a corner point area.

The second reference corner point unit 8032 may be configured to determine second corner point(s) corresponding to the first reference corner points as second reference corner point(s) according to the attribute information.

The location information determination unit 8033 may be configured to determine location information of the first corner points according to a locational relationship between the first corner points and the first reference corner point(s); and determine location information of the second corner points according to a locational relationship between the second corner points and the second reference corner point(s).

The correspondence relationship establishment unit 8034 may be configured to map a first corner point with a second corner point having the same location information as that of the first corner point.

In some embodiments, the initial image may be a barrel image, comprising a plurality of first corner points arranged in an array, the first reference corner points may comprise a central corner point which is a first corner located at a center of the barrel image, and an area of the central corner point is different from those of first corner points other than the central corner point.

The first reference corner points may further comprise lateral corner points and longitudinal corner points. The lateral corner points are first corner points located in the same row as that of the central corner point, and the longitudinal corner points are first corner points located in the same column as that of the central corner point. The lateral corner points, the longitudinal corner points, and first corner points other than the lateral corner points and the longitudinal corner points have different colors from each other.

The corner point determination module 804 may be configured to determine whether the second corner points satisfy a preset condition.

In an implementation of the present embodiment, the corner point determination module 804 may comprise a distance calculation unit 8041 configured to calculate a distance between each of the second corner points and a corresponding preset reference point; and a preset condition determination unit 8042 configured to determine that the second corner point satisfies the preset condition when the distance is less than or equal to the preset threshold.

The corner point adjustment module 805 may be configured to adjust first corner points corresponding to second corner points which do not satisfy the preset condition before the parameter determination module determines the distortion parameters of the display device according to second corner points which satisfy the preset condition and corresponding first corner points, so that second corner points corresponding to the adjusted first corner points satisfy the preset condition.

The parameter determination module 806 may be configured to determine the distortion parameters of the display device according to the second corner points which satisfy the preset condition and the corresponding first corner points.

The apparatus for determining distortion parameters according to the present embodiment may implement various processes in the above embodiments of the method for measuring distortion parameters, and will not be described in detail here to avoid repetition.

With the apparatus for measuring distortion parameters according to the present embodiment, the distortion parameters of the display device are determined by the parameter determination module according to second corner points on the distortion image which satisfy the preset condition and corresponding first corner points on the initial image. The apparatus for measuring distortion parameters according to the present embodiment may eliminate the need for artificial blind adjustment, thus making the measurement of the distortion parameters easier, and may accurately calculate distortion parameters at a plurality of points on the display device, which improves the measurement efficiency, thereby further improving the accuracy of correction of distortion.

Figure 9:
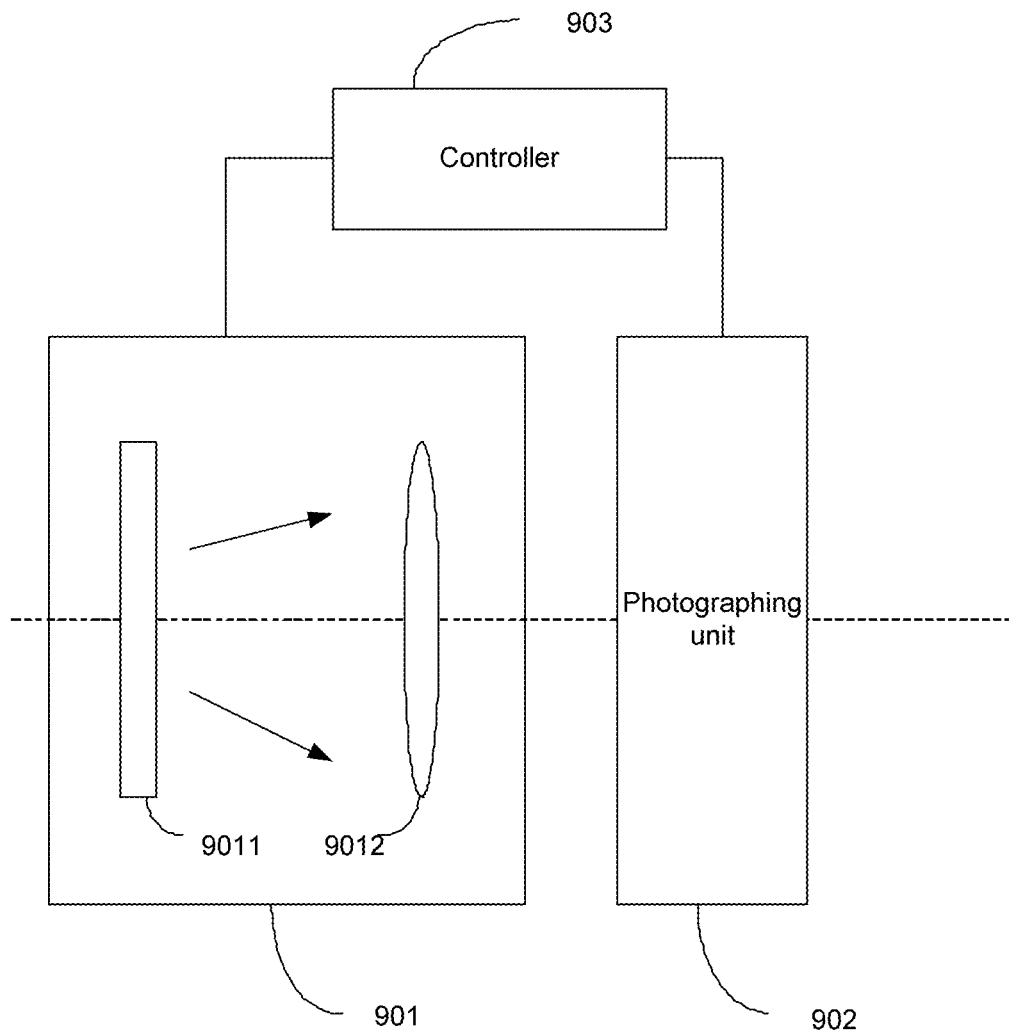
FIG. 9 illustrates a schematic structural diagram of a system for measuring distortion parameters according to an embodiment of the present disclosure.

An embodiment of the present disclosure provides a system for measuring distortion parameters. As shown in FIG. 9, the system for measuring distortion parameters may comprise a display device 901 and a device for measuring distortion parameters of the display device 901. In FIG. 9, the measurement device comprises a photographing unit 902 such as a camera and a controller 903.

The display device 901 comprises a display screen 9011 and a lens 9012 located on a light exiting side of the display screen 9011.

The photographing unit 902 is located on one side of the lens 9012 away from the display screen 9011. The controller 903 is connected to the display screen 9011 of the display device 901 and the photographing unit 902 respectively. The controller 903 may be configured to perform the method for measuring distortion parameters according to any of the embodiments described above.

In some embodiments, the controller 903 comprises, but not limited to, a Personal Computer (PC) computer, a laptop computer, a tablet computer, a notebook computer, a Central Processing Unit (CPU), an Application Specific Integrated Circuit (ASIC), a Field Programmable Gate Array (FPGA), a Micro-Controller Unit (MCU) etc. The display device 901 comprises, but not limited to, a VR device to be measured. The photographing unit 902 comprises, but not limited to, a camera etc. For example, the PC computer is connected to the VR device to be measured to control display content of the VR device to be measured, and is connected to the camera to receive an image photographed by the camera.

The content displayed by the VR device to be measured may be controlled by the controller 903, and the camera is used to photograph an image displayed by the VR device to be measured and transmit the image to the controller 903. In a practical measurement process, it is necessary to ensure that a center of the camera, a center of the lens and a center of the display screen are in a straight line.

An embodiment of the present disclosure further provides a non-transitory computer-readable storage medium having stored thereon a computer program (instructions), which when executed by a processor, cause the processor to execute the steps of the method for measuring distortion parameters according to any of the embodiments of the present disclosure described above.

The embodiments of the present disclosure provide a method, apparatus and measurement device for measuring distortion parameters and a computer-readable medium, which are used to measure distortion parameters of a display device. The display device comprises a display screen and a lens located on a light exiting side of the display screen. Here, the method for measuring distortion parameters comprises: acquiring a distortion image which is generated after an initial image passes through the lens, wherein the initial image is an image displayed on the display screen, and comprises a plurality of first corner points, and the distortion image comprises a plurality of second corner points which match the plurality of first corner points; and determining the distortion parameters of the display device according to a locational relationship between at least one of the plurality of second corner points and the first corner point(s) which matches the at least one second corner point. The distortion parameters of the display device are determined according to second corner points on the distortion image which satisfy the preset condition and corresponding first corner points on the initial image. This method for measuring distortion parameters may eliminate the need for artificial blind adjustment, thus making the measurement of the distortion parameters easier, and the measurement method may accurately calculate distortion parameters at a plurality of points on the display device, which improves the measurement efficiency, thereby further improving the accuracy of correction of distortion. Further, the technical solutions according to the present embodiment may calculate a relationship between second corner points (image plane points) which satisfy a preset condition and corresponding first corner points (object plane points), and the first corner points (object plane points) are adjusted, to finally calculate a correspondence relationship between the adjusted first corner points and corresponding second corner points when the second corner points (image plane points) are "horizontal and vertical" and distortion parameters. During the measurement process, there is no need to perform artificial blind adjustment, and accurate large-scale actual distortion parameters may be automatically calculated directly, which may greatly improve the efficiency of software development.

It should be illustrated that relational terms such as first and second herein are only used to distinguish one entity or operation from another entity or operation, and do not necessarily require or imply that there is any such actual relationship or order among these entities or operations. Moreover, the terms "including," "comprising," or any other variations thereof are intended to encompass non-exclusive inclusion, so that a process, method, product, or device which comprises a series of elements comprises not only those elements but also other elements which are not explicitly listed, or elements which are inherent to such a process, method, product, or device. Without more restrictions, elements defined by a statement "comprising a . . . " do not exclude the existence of other identical elements in the process, method, product or device comprising the elements.

The method, apparatus and VR device for measuring distortion parameters according to the present disclosure have been described in detail above. Specific examples are used herein to explain the principles and implementations of the present disclosure. The descriptions of the above embodiments are only used to facilitate understanding the methods and concepts of the present disclosure, and should not be construed as limiting the present disclosure.

We claim:

1. A method for measuring distortion parameters of a display device comprising a display screen and a lens located on a light exiting side of the display screen, the method comprising:

acquiring a distortion image which is generated by imaging an initial image through the lens, wherein the initial image is a barrel image displayed on the display screen, the initial image comprises a plurality of first corner points arranged in a first array, and the distortion image comprises a plurality of second corner points which match the plurality of first corner points respectively and arranged in a second array;

determining whether locations of the plurality of second corner points in the distortion image satisfy a preset condition defined by a third array of reference locations;

when a location of at least one of the plurality of second corner points in the distortion image does not satisfy the preset condition, determining that a distortion of the distortion image with respect to the third array is greater than a preset distortion threshold, adjusting the location of the first corner point, which matches the second corner point of which the location does not satisfy the preset condition, in the initial image, and returning to execute the step of acquiring a distortion image which is generated by imaging an initial image through the lens, until all the plurality of second corner points in the distortion image satisfy the preset condition, in order to adjust the distortion image to have a distortion with respect to the third array being smaller than the preset distortion threshold; and when locations of all the plurality of second corner points in the distortion image satisfy the preset condition determining that a distortion of the distortion image with respect to the third array is smaller than the preset distortion threshold, and determining a distortion of the distortion image with respect to the initial image based on the difference between the distortion image and the initial image, wherein determining a distortion of the distortion image with respect to the initial image based on the difference between the distortion image and the initial image comprises:

determining the distortion parameters of the display device according to a locational relationship between at least one of the plurality of second corner points in the distortion image and a first corner point, which matches the at least one second corner point, in the initial image, wherein determining whether locations of the plurality of second corner points in the distortion image satisfy a preset condition comprises:

calculating a distance between a location of each of the second corner points in the distortion image and a reference location preset for the second corner point; and determining that the second corner point satisfies the preset condition when the distance is less than or equal to a preset threshold, wherein reference locations arranged in the third array are preset for the second corner points in one-to-one correspondence;

wherein reference locations in each row in the third array are arranged in a straight line, a straight line in which reference locations in each row in the third array are arranged is parallel to a straight line in which reference locations in another row in the third array are arranged;

wherein reference locations in each column in the third array locations are arranged in a straight line, and a straight line in which reference locations in each column in the third array are arranged is parallel to a straight line in which reference locations in another column in the third array are arranged.

2. The method according to claim 1, wherein the distortion image is generated by photographing the initial image by an image collector through the lens, and the method further comprises:
   correcting the distortion image according to parameters of the image collector.

3. The method according to claim 1, wherein the first corner points are arranged in a first array, the second corner points are arranged in a second array, and the method further comprises:
   determining locations of the plurality of first corner points in the first array and locations of the plurality of second corner points in the second array; and
   for each of the first corner points, determining a second corner point having a location in the second array identical to the location of the first corner point in the first array, as the second corner point which matches the first corner point.

4. The method according to claim 3, wherein determining locations of the plurality of first corner points in the first array and locations of the plurality of second corner points in the second array comprises:
   determining at least one of the plurality of first corner points as a first reference corner point having attribute information different from that of first corner points other than the first reference corner point, wherein the attribute information comprises at least one of a corner point color and a corner point area;
   determining at least one of the plurality of second corner points as a second reference corner point which matches the first reference corner point according to the attribute information; and
   determining the locations of the plurality of first corner points in the first array according to a locational relationship between the first reference corner point and other first corner points, and determining the locations of the plurality of second corner points in the second array according to a locational relationship between the second reference corner point and other second corner points.

5. The method according to claim 4, wherein the initial image is the barrel image comprising the plurality of first corner points arranged in the first array, and the first reference corner point comprise a central corner point which is the first corner point located at a center of the first array, wherein the center corner point has an area different from those of first corner points other than the central corner point.

6. The method according to claim 5, wherein determining at least one of the plurality of second corner points as a second reference corner point which matches the first reference corner point according to the attribute information comprises: determining a second corner point in the second array having an area different from those of other second corner points as the second reference corner point which matches the central corner point in the first array.

7. The method according to claim 5, wherein the first reference corner points further comprise: lateral corner points and longitudinal corner points, wherein the lateral corner points are first corner points located in the same row as the central corner point, the longitudinal corner points are first corner points located in the same column as the central corner point, the lateral corner points have a first color, the longitudinal corner points have a second color, and first corner points other than the lateral corner points and the longitudinal corner points have a third color, wherein the first color, the second color, and the third color are different from each other.

8. The method according to claim 7, wherein determining at least one of the plurality of second corner points as a second reference corner point which matches the first reference corner point according to the attribute information comprises: determining second corner points in the second array having the first color as second reference corner points which match the lateral corner points in the first array, and determining second corner points in the second array having the second color as second reference corner points which match the longitudinal corner points in the first array.

9. A measurement device for measuring distortion parameters of a display device comprising a display screen and a lens located on a light exiting side of the display screen, the measurement device comprising:
   an image collector located on one side of the lens facing away from the display screen, and configured to photograph an initial image displayed on the display device through the lens to obtain a distortion image; and
   a controller connected to the display screen of the display device and the image collector, and configured to perform the method according to claim 1.

10. A non-transitory computer-readable medium having stored thereon instructions which, when executed by a processor, cause the processor to perform the method according to claim 1.

11. An apparatus for measuring distortion parameters of a display device comprising a display screen and a lens located on a light exiting side of the display screen, the apparatus comprises a memory and a processor, wherein the memory has instructions stored therein, and the processor is configured to execute the instructions to:
   acquire a distortion image which is generated by imaging an initial image through the lens, wherein the initial image is a barrel image displayed on the display screen, the initial image comprises a plurality of first corner points arranged in a first array, and the distortion image comprises a plurality of second corner points which match the plurality of first corner points respectively and arranged in a second array;
   determine whether locations of the plurality of second corner points in the distortion image satisfy a preset condition defined by a third array of reference locations;
   when a location of at least one of the plurality of second corner points in the distortion image does not satisfy the preset condition, determine that a distortion of the distortion image with respect to the third array is greater than a preset distortion threshold, adjust the location of the first corner point, which matches the second corner point of which the location does not satisfy the preset condition, in the initial image, and return to execute the step of acquiring a distortion image which is generated by imaging an initial image through the lens, until all the plurality of second corner points in the distortion image satisfy the preset condition, in order to adjust the distortion image to have a distortion with respect to the third array being smaller than the preset distortion threshold; and
   when locations of all the plurality of second corner points in the distortion image satisfy the preset condition determine that a distortion of the distortion image with respect to the third array is smaller than the preset distortion threshold, and determine a distortion of the distortion image with respect to the initial image based on the difference between the distortion image and the initial image, wherein determining a distortion of the distortion image with respect to the initial image based on the difference between the distortion image and the initial image comprises:

determine the distortion parameters of the display device according to a locational relationship between at least one of the plurality of second corner points in the distortion image and the first corner point, which matches the at least one second corner point, in the initial image, wherein the processor is further configured to execute the instructions to:

calculating a distance between a location of each of the second corner points in the distortion image and a reference location preset for the second corner point; and determining that the second corner point satisfies the preset condition when the distance is less than or equal to a preset threshold, wherein reference locations arranged in the third array are preset for the second corner points in one-to-one correspondence;

wherein reference locations in each row in the third array are arranged in a straight line, a straight line in which reference locations in each row in the third array are arranged is parallel to a straight line in which reference locations in another row in the third array are arranged;

wherein reference locations in each column in the third array locations are arranged in a straight line, and a straight line in which reference locations in each column in the third array are arranged is parallel to a straight line in which reference locations in another column in the third array are arranged.

12. The apparatus according to claim 11, wherein the distortion image is generated by photographing the initial image by an image collector through the lens, and the processor is further configured to:

correct the distortion image according to parameters of the image collector.

13. The apparatus according to claim 11, wherein the first corner points are arranged in a first array, the second corner points are arranged in a second array, and the processor is further configured to:

determine locations of the plurality of first corner points in the first array and locations of the plurality of second corner points in the second array, and for each of the first corner points, determine a second corner point having a location in the second array identical to the location of the first corner point in the first array, as the second corner point which matches the first corner point.

14. The apparatus according to claim 13, wherein the processor is configured to determine the locations of the plurality of first corner points in the first array and the locations of the plurality of second corner points in the second array by:

determining at least one of the plurality of first corner points as a first reference corner point having attribute information different from that of first corner points other than the first reference corner point, wherein the attribute information comprises at least one of a corner point color and a corner point area;

determining at least one of the plurality of second corner points as a second reference corner point which matches the first reference corner point according to the attribute information;

determining the locations of the plurality of first corner points in the first array according to a locational relationship between the first reference corner point and other first corner points, and determine the locations of the plurality of second corner points in the second array according to a locational relationship between the second reference corner point and other second corner points; and for each of the first corner points, determining a second corner point having a location in the second array identical to the location of the first corner point in the first array, as the second corner point which matches the first corner point.

15. The apparatus according to claim 14, wherein the initial image is the barrel image comprising the plurality of first corner points arranged in the first array, and the first reference corner points comprise a central corner point which is the first corner point located at a center of the first array, wherein the center corner point has an area different from those of first corner points other than the central corner point.

16. The apparatus according to claim 11, wherein the processor is further configured to: determine whether locations of the plurality of second corner points in the distortion image satisfy a preset condition, and when locations of the plurality of second corner points in the distortion image satisfy the preset condition, execute the step of determining the distortion parameters of the display device according to the locational relationship between at least one of the plurality of second corner points and the first corner point which matches the at least one second corner point, wherein the processor is configured to determine whether the locations of the plurality of second corner points in the distortion image satisfy the preset condition by:

calculating a distance between a location of each of the second corner points in the distortion image and a preset reference location for the second corner point; and determining that the second corner point satisfies the preset condition when the distance is less than or equal to a preset threshold.

17. The apparatus according to claim 16, wherein the processor is further configured to: in a case where a location of at least one of the plurality of second corner points in the distortion image does not satisfy the preset condition, adjust the location of the first corner point, which matches the second corner point of which the location does not satisfy the preset condition, in the initial image, and re-execute the step of acquiring a distortion image which is generated after an initial image passes through the lens, until all the plurality of second corner points in the distortion image satisfy the preset condition.

* * * * *